United States Patent
Gluck et al.

(10) Patent No.: US 7,143,176 B2
(45) Date of Patent: Nov. 28, 2006

(54) DATA COMMUNICATION WITH A PROTOCOL THAT SUPPORTS A GIVEN LOGICAL ADDRESS RANGE

(75) Inventors: Olympia Gluck, Haifa (IL); Gilad Sharaby, Allon Hagalil (IL); Gabriel Walder, Kiryat Haim (IL); Erez Webman, Petah Tikva (IL)

(73) Assignee: International Business Machines Corporation, Armonk, NY (US)

(*) Notice: Subject to any disclaimer, the term of this patent is extended or adjusted under 35 U.S.C. 154(b) by 1012 days.

(21) Appl. No.: 09/985,788

(22) Filed: Nov. 6, 2001

(65) Prior Publication Data

US 2003/0088638 A1    May 8, 2003

(51) Int. Cl.
    *G06F 15/16*   (2006.01)
(52) U.S. Cl. ............ 709/230; 709/217; 709/231; 709/236; 709/245; 709/248; 710/70; 725/115
(58) Field of Classification Search ............ 709/217, 709/230, 231, 236, 245, 248; 710/70; 725/115
    See application file for complete search history.

(56) References Cited

U.S. PATENT DOCUMENTS

| | | | | |
|---|---|---|---|---|
| 5,600,795 A | * | 2/1997 | Du | 709/227 |
| 6,088,815 A | * | 7/2000 | West et al. | 714/15 |
| 6,131,148 A | * | 10/2000 | West et al. | 711/162 |
| 6,415,313 B1 | * | 7/2002 | Yamada et al. | 709/200 |
| 6,802,068 B1 | * | 10/2004 | Guruprasad | 719/319 |
| 2001/0007560 A1 | * | 7/2001 | Masuda et al. | 370/401 |
| 2003/0204618 A1 | * | 10/2003 | Foster et al. | 709/238 |

OTHER PUBLICATIONS

Kuzler et al., "IBM Enterprise Storage Server", IBM International Technical Support Organization, San Jose, California, 1999, table of contents only.
Standard X3.131:1994 of the American National Standards Institute (ANSI—Washington, DC.), table of contents only.
The Symmetrix Remote Data Facility (SRDF™), Produced by EMC Corporation (Hopkinton, Massachusetts), May 2001, table of contents only.
IBM Publication SA22-7202-02, "Enterprise Systems Architecture/ 390: ESCON I/O Interface", IBM Corporation, Armonk, New York, 1992.

* cited by examiner

*Primary Examiner*—Saleh Najjar
*Assistant Examiner*—Liang-Che Alex Wang
(74) *Attorney, Agent, or Firm*—Browdy and Neimark, PLLC

(57) ABSTRACT

A method for copying data over a network operating in accordance with a protocol, such as the ESCON protocol, that supports a given logical address range includes establishing a logical path over the network from a primary storage system to a secondary storage system using path logical addresses within the given logical address range. A virtual path is created over the logical path to carry the data from a source storage device in a first logical subsystem of the primary storage system to a target storage device in a second logical subsystem of the secondary storage system, wherein the first and second logical subsystems have respective first and second subsystem logical addresses which are outside the given logical address range. The virtual path is used in a peer-to-peer remote copy (PPRC) operation to copy the data from the source storage device to the target storage device.

30 Claims, 3 Drawing Sheets

DATA COMMUNICATION WITH A PROTOCOL THAT SUPPORTS A GIVEN LOGICAL ADDRESS RANGE

FIELD OF THE INVENTION

The present invention relates generally to data storage systems, and specifically to storage systems that support multiple types of storage devices, operating according to different standards and protocols.

BACKGROUND OF THE INVENTION

Large-scale computer storage systems typically comprise multiple arrays of storage devices. An example of such as system is the IBM Enterprise Storage Server (ESS), sold by IBM Corporation of Armonk, N.Y. The ESS is described by Kulzer et al., in a publication entitled *IBM Enterprise Storage Server* (IBM International Technical Support Organization, San Jose, Calif., 1999), which is incorporated herein by reference. It comprises a control unit (CU), typically made up of a cluster of microprocessors, having a cache memory and non-volatile storage. The controller supports one or more logical subsystems (LSS), each of which comprises an array of storage volumes, typically made up of magnetic disks.

The Enterprise System Connection (ESCON™) standard was defined by IBM to enable reliable, high-speed serial data transfer over long distances between host processors and storage systems. ESCON is described in IBM publication SA22-7202-02, entitled *Enterprise Systems Architecture/390: ESCON I/O Interface* (IBM Corporation, Armonk, N.Y., 1992), which is incorporated herein by reference. ESCON specifies two levels of protocols: the link level and the device level. The link level describes the physical characteristics of a channel path (between a host and storage subsystem), along with the associated protocols required for the transmission and reception of frames over the path. The device level relates primarily to the protocols associated with the execution of an input/output (I/O) operation for a specific I/O device.

ESCON link-level addressing provides an eight-bit link address for each storage system CU, with a four-bit logical address extension identifying a "control unit image" (CUI, which is used as a synonymous for LSS). The combination of the link address and logical extension is referred to as a logical address. Since the logical address extension is four bits long, up to 16 LSSs are supported, at logical addresses 0 through 15, in each CU in the ESCON network. Each data frame transmitted over an ESCON link has a link header that specifies the link address and logical address of the source and destination of the frame.

Following the header, each link frame contains an information field. When the link frame is a device frame (i.e., a link frame relating to a specific device I/O operation), the information field contains a device header and a device information block. The device header includes, inter alia, an eight-bit device address, meaning that up to 256 storage devices can be attached to a given LSS. The information field can carry commands, data, control information and status. The commands are normally specified by a chain of Channel Command Words (CCWs) provided by the I/O program being executed in "count, key, data" (CKD) format. CKD is the disk architecture used in IBM S/390 systems and allows data records to be of variable size (count) A command to write to a given target storage volume is followed by a sequence of one or more data frames containing the data to be written. Typically, the system to which the data were written returns a status frame describing the results of the completion of the I/O operation (success or failure).

To write data to a target storage volume, the channel subsystem of the host (i.e., the host I/O interface) selects the physical and logical link addresses of the corresponding LSS and the device address of the volume and submits a chain of one or more CCWs. An ESCON channel path, called a logical path, is set up between the channel subsystem and the addressed LSS. To write data to a target storage volume, the channel subsystem of the host (i.e., the host I/O interface) selects an available logical path that connects it to the target LSS and sends the chain of CCWs to the desired target volume, indicated by the device address. Thus, selection of the logical path determines the source and target LSSs, while the device address determines to which device in the target LSS the I/O will be directed. The logical path may be used exclusively for data transfer between the host and the specified storage device until the chain is completed. This type of channel use is referred to as "selector" mode, as opposed to "multiplexer" mode, which enables sharing of the link by several chains, each using a different logical path established over the link. At the completion of the chain, the storage device returns an "ending status" indication, and the channel path is released.

Data backup is a standard part of all large-scale computer data storage systems (and most small systems, as well). Data written to a primary storage medium, such as a volume on a local storage subsystem, are copied to a backup medium, typically another volume on a remote storage subsystem, which can then be used for recovery in case a disaster causes the data on the primary medium to be lost. Kulzer et al describe a number of different copy service functions of the ESS that can be used for this purpose. Among these functions is peer-to-peer remote copy (PPRC), in which a mirror copy of a source volume on a primary storage subsystem is created on a secondary storage subsystem. PPRC is implemented using a direct ESCON link between the primary and secondary subsystems, both residing in respective CUs (as opposed to the host-to-CU type of ESCON link described previously). When an application on a host processor writes to a PPRC volume on the primary subsystem, the corresponding data updates are entered into cache memory and non-volatile storage at the primary subsystem. The CU of the primary subsystem then sends the updates over the link to the secondary subsystem, using the data link and device level protocols described above. When the secondary subsystem has placed the data in its own cache and non-volatile storage, it acknowledges receipt of the data, and the primary subsystem then signals the application that the write operation is complete.

Most disks and disk systems sold today do not support the CKD format specified by ESCON, but rather comply with the Small Computer System Interface (SCSI) standard. SCSI devices are addressed using "Write Fixed Block Data" commands (WFBD, which is a standard CCW). These commands are similar in form to CKD commands (known as PFX CCWs or Prefix CCWs), but not, identical. The SCSI command set is described in standard X3.131:1994 of the American National Standards Institute (ANSI—Washington, D.C.), which is incorporated herein by reference. Among other differences, data can be written to SCSI devices only in blocks of fixed size, rather than in variable-size records as supported by CKD. Current-generation storage systems, such as the above-mentioned IBM ESS, allow both CKD and SCSI devices to be connected to and controlled by the same CU. In order to comply with the ESCON link-level and device-level protocols, as described above, LSS0 through LSS15 must contain only CKD devices. Higher LSS addresses (LSS16 and up) can be used for SCSI devices. Because ESCON provides only a four-bit logical address, however, there is no straightforward way of addressing any LSS above LSS15 over an ESCON link while maintaining full compliance with the ESCON protocols. This limitation interferes with the possibility of carrying out PPRC operations between SCSI disks over ESCON links.

The Symmetrix Remote Data Facility (SRDF™), produced by EMC Corporation (Hopkinton, Mass.), offers PPRC-type data copying facilities. SRDF supports SCSI devices over ESCON links by using a proprietary device-level protocol. As a result, SRDF is not fully ESCON-compliant and therefore cannot be interfaced transparently to existing ESCON-based systems and software.

SUMMARY OF THE INVENTION

Preferred embodiments of the present invention provide storage systems and methods that enable fixed-block storage devices to be addressed over ESCON links while maintaining full compatibility with ESCON protocols. These embodiments are useful particularly in facilitating PPRC operations between fixed-block storage volumes, as well as between CKD volumes.

In some preferred embodiments of the present invention, a primary and a secondary storage system each comprise multiple LSSs, to which both CKD and fixed-block storage devices are attached. Preferably, LSS0 through LSS15 are used for CKD devices, in accordance with ESCON protocols, while LSS16 and above can be used for either CKD or fixed-block devices. One of the logical addresses used on ESCON paths between the primary and secondary storage systems, preferably logical address 0000 (corresponding to LSS0) is assigned for use in addressing LSS16 and above.

When a PPRC operation is to take place between devices on LSS16 and above, the control unit of the primary storage system maps the ESCON communications involved to the assigned logical address. This mapping creates a virtual channel path for the PPRC operation over the logical channel path from LSS0 of the primary system to LSS0 of the secondary system. The control unit encodes the actual LSS and device address of the target device as part of the data carried by the ESCON data frames that it sends to the secondary system. Preferably, the actual LSS and device address are embedded in the parameter list of the PFX or WFBD CCW, in the first part of the data sent with the CCW. All frames comply with the ESCON protocol, in that their headers contain a valid logical address (0000) and device address. When the frames reach the secondary storage system, however, the control unit of that system ignores the header addresses and instead directs the PPRC operation to the actual LSS and device address embedded in the parameter list. In this manner, multiple virtual channel paths, suitable for carrying out PPRC operations between either fixed block or CKD devices, can be created over a single logical channel path between the primary and secondary storage systems, while maintaining full compliance with ESCON protocols.

There is therefore provided, in accordance with a preferred embodiment of the present invention, a method for copying data over a network operating in accordance with a protocol that supports a given logical address range, the method including:

establishing a logical path over the network from a primary storage system to a secondary storage system using path logical addresses within the given logical address range;

creating a virtual path over the logical path to carry the data from a source storage device in a first logical subsystem of the primary storage system to a target storage device in a second logical subsystem of the secondary storage system, the first and second logical subsystems having respective first and second subsystem logical addresses which are outside the given logical address range;

initiating a peer-to-peer remote copy (PPRC) operation to copy the data from the source storage device to the target storage device by sending a command frame over the logical path from the primary storage system to the secondary storage system, followed by a first data frame identifying the virtual path from the source storage device to the target storage device, such that both the command and data frames are arranged to comply with the protocol; and sending one or more further data frames over the logical path following the first data frame, the further data frames complying with the protocol and containing the data to be copied in the PPRC operation.

Preferably, creating the virtual path includes creating a plurality of virtual paths to carry the data between respective source and target storage devices, and establishing the logical path includes designating one of the path logical addresses to carry the plurality of the virtual paths.

Further preferably, the method includes establishing a further logical path over the network to carry the data in a further PPRC operation between further source and destination storage devices in third and fourth logical subsystems of the primary and secondary storage systems, respectively, both the third and fourth logical subsystems having respective third and fourth subsystem logical addresses within the given logical address range, and conveying the data between the further source and destination storage devices over the further logical path in accordance with the protocol. Most preferably, the source and destination storage devices in the first and second logical subsystems include fixed-block storage devices, while the further source and destination storage devices in the third and fourth logical subsystems include devices of a type that stores records of variable size.

Additionally or alternatively, in accordance with the protocol, the command frame includes a device header containing an address of the target storage device, and the method includes, when the frames arrive at the secondary storage system on the designated one of the path logical addresses, ignoring the device header of the command frame so as to read the second subsystem logical address and the address of the target storage device from the first data frame.

In a preferred embodiment, initiating the PPRC operation includes creating a chain of one or more channel command words (CCWs), and reserving the logical path exclusively for the virtual path for the duration of the chain, whereby all of the frames associated with the chain are directed to the target storage device. Preferably, the method includes, upon completion of the chain, sending an ending status frame in accordance with the protocol from the secondary storage system to the primary storage system to indicate successful completion of the CCWs, and releasing the reserved logical path responsive to the ending status frame.

Preferably, initiating the PPRC operation includes inserting a command parameter list in a data block of the first data frame, wherein the list identifies the second logical subsystem and the target storage device. In a preferred embodiment, the command parameter list may belong to a Write Fixed Block Data (WFBD) command in accordance with a Small Computer System Interface (SCSI) standard or to a count key data (CKD) Prefix.

There is also provided, in accordance with a preferred embodiment of the present invention, a method for copying data over a network operating in accordance with a protocol that supports storage devices of a first type that store records of variable size, the method including:

establishing a logical path over the network to carry the data from a source storage device in a primary storage system to a target storage device in a secondary storage system, both the source and target storage devices being of a second type that store records only of fixed-block size;

initiating a peer-to-peer remote copy (PPRC) operation to copy the data from the source storage device to the target storage device by sending a command frame over the logical path from the primary storage system to the secondary storage system, followed by a first data frame identifying the target storage device, such that both the command and data frames are in a form compliant with the protocol for the first type of storage devices that store records of variable size; and sending one or more further data frames over the logical path following the first data frame, the further data frames complying with the protocol and containing the data to be copied in the PPRC operation.

In a preferred embodiment, the first type of storage devices includes a count key data (CKD) type, while the second type of storage devices includes a Small Computer System Interface (SCSI) type.

Preferably, the method includes establishing a further logical path over the network to carry the data in a further PPRC operation between further source and destination storage devices of the first type in the primary and secondary storage systems, respectively, and conveying the data between the further source and destination storage devices over the further logical path in accordance with the protocol.

There is additionally provided, in accordance with a preferred embodiment of the present invention, a data storage system, including:

one or more logical subsystems, including at least a first logical subsystem having a first subsystem logical address, each of the logical subsystems including one or more storage devices arranged to store data; and a control unit, coupled to the logical subsystems and to a network operating in accordance with a protocol that supports a given logical address range, the control unit being arranged to establish a logical path over the network to a secondary storage system using path logical addresses within the given logical address range, and to create a virtual path over the logical path to carry the data from a source storage device among the one or more storage devices in the first logical subsystem to a target storage device in a second logical subsystem of the secondary storage system having a second subsystem logical address, wherein the first and second subsystem logical addresses are outside the given logical address range, wherein the control unit is further arranged to initiate a peer-to-peer remote copy (PPRC) operation to copy the data from the source storage device to the target storage device by sending a command frame over the logical path to the secondary storage system, followed by a first data frame identifying the target storage device, such that both the command and data frames are arranged to comply with the protocol, and to send one or more further data frames over the logical path following the first data frame, the further data frames complying with the protocol and containing the data to be copied in the PPRC operation.

There is further provided, in accordance with a preferred embodiment of the present invention, a data storage system, including:

a plurality of storage devices arranged to store data, the devices including one or more devices of a first type that store records of variable size and one or more devices of a second type that store records only of a fixed-block size; and a control unit, coupled to the storage devices and to a network operating in accordance with a protocol that supports the storage devices of the first type, the control unit being arranged to establish a logical path over the network to carry the data from a source storage devices among the storage devices of the second type to a target storage device of the second type in a secondary storage system, and to initiate a peer-to-peer remote copy (PPRC) operation to copy the data from the source storage device to the target storage device by sending a command frame over the logical path to the secondary storage system, followed by a first data frame identifying the target storage device, such that both the command and data frames are in a form compliant with the protocol, and to send one or more further data frames over the logical path following the first data frame, the further data frames complying with the protocol and containing the data to be copied in the PPRC operation.

There is moreover provided, in accordance with a preferred embodiment of the present invention, a computer software product for use in a data storage system that is coupled to a network operating in accordance with a protocol that supports a given logical address range, the data storage system including one or more logical subsystems, which include at least a first logical subsystem having a first subsystem logical address, each of the logical subsystems including one or more storage devices arranged to store data, the product including a computer-readable medium in which program instructions are stored, which instructions, when read by a computerized control unit of the data storage system, cause the control unit to establish a logical path over the network to a secondary storage system using path logical addresses within the given logical address range, and to create a virtual path over the logical path to carry the data from a source storage device among the one or more storage devices in the first logical subsystem to a target storage device in a second logical subsystem of the secondary storage system having a second subsystem logical addresses, wherein the first and second subsystem logical addresses are outside the given logical address range, and wherein the instructions further cause the control unit to initiate a peer-to-peer remote copy (PPRC) operation to copy the data from the source storage device to the target storage device by sending a command frame over the logical path to the secondary storage system, followed by a first data frame identifying the target storage device, such that both the command and data frames are arranged to comply with the protocol, and to send one or more further data frames over the logical path following the first data frame, the further data frames complying with the protocol and containing the data to be copied in the PPRC operation.

There is furthermore provided, in accordance with a preferred embodiment of the present invention, a computer software product for use in a data storage system that includes a plurality of storage devices arranged to store data, including one or more devices of a first type that store records of variable size and one or more devices of a second type that store records only of a fixed-block size, wherein the data storage system is coupled to a network operating in accordance with a protocol that supports the storage devices of the first type, the product including a computer-readable medium in which program instructions are stored, which instructions, when read by a computerized control unit of the data storage system, cause the control unit to establish a logical path over the network to carry the data from a source storage devices among the storage devices of the second type to a target storage device of the second type in a secondary storage system, and to initiate a peer-to-peer remote copy (PPRC) operation to copy the data from the source storage device to the target storage device by sending a command frame over the logical path to the secondary storage system, followed by a first data frame identifying the target storage device, such that both the command and data frames are in a form compliant with the protocol, and to send one or more further data frames over the logical path following the first data frame, the further data frames complying with the protocol and containing the data to be copied in the PPRC operation.

The present invention will be more fully understood from the following detailed description of the preferred embodiments thereof, taken together with the drawings in which:

DETAILED DESCRIPTION OF PREFERRED EMBODIMENTS

Figure 1:
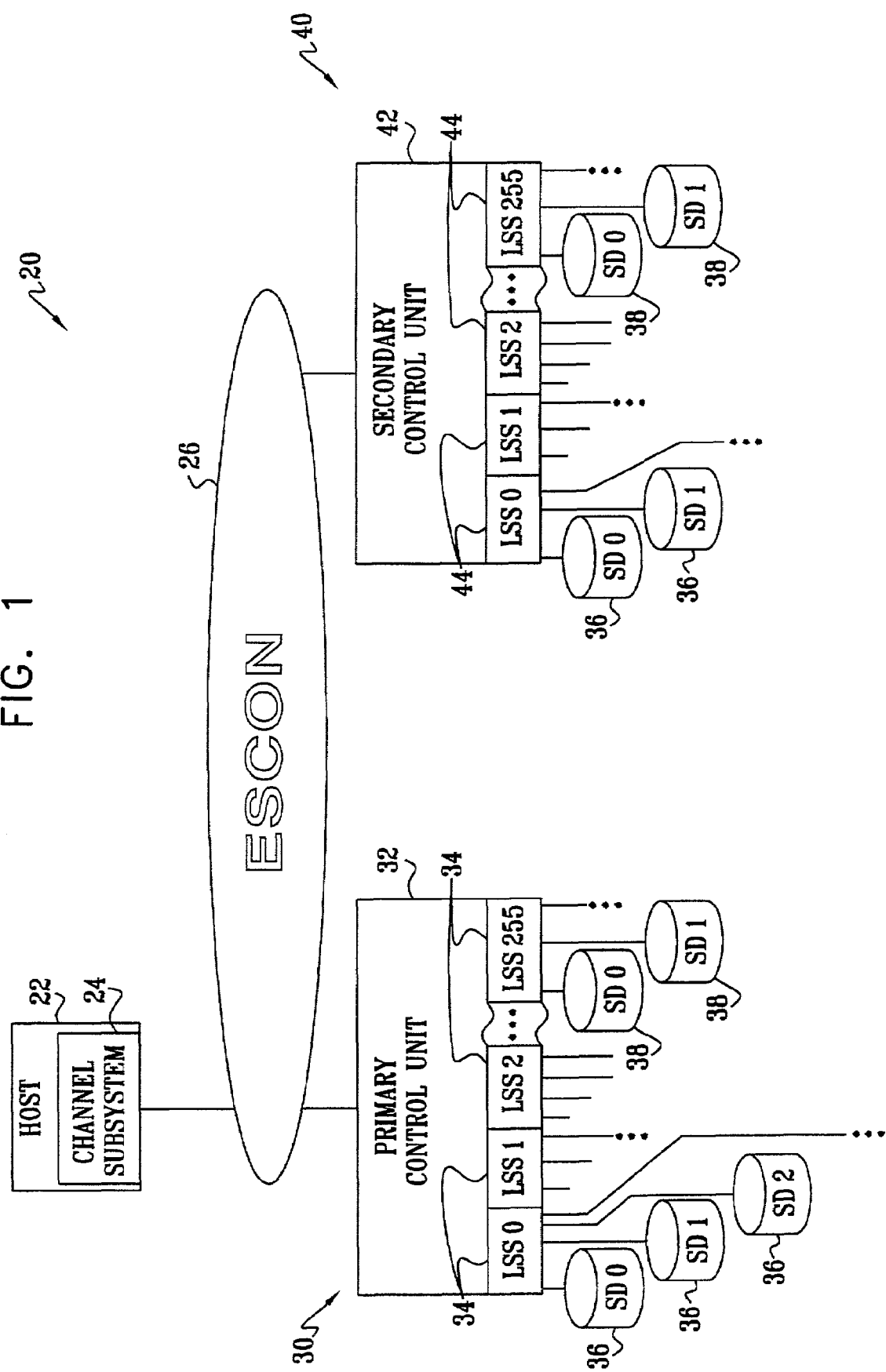
FIG. 1 is a block diagram that schematically illustrates data storage apparatus, in accordance with a preferred embodiment of the present invention.

FIG. 1 is a block diagram that schematically illustrates apparatus 20 for data storage, in accordance with a preferred embodiment of the present invention. A host 22, typically a general-purpose computer, writes data to be stored via an I/O adapter, which is a part of a channel subsystem 24. The data are conveyed via a storage network 26 to a primary storage system 30. Network 26 comprises fiberoptic links and switches (not shown), as are known in the art, operating in accordance with the ESCON standard. System 30 comprises a control unit (CU) 32, which controls a plurality of logical subsystems (LSSs) 34, preferably up to 256 such subsystems. The CU typically comprises a central processing unit or one or more clusters of computer processors, preferably two such clusters. Each of the LSSs comprises an array of storage devices, comprising disks that are presented to host 22 as CKD disks 36 or fixed-block disks 38 (which are typically SCSI-compatible disks). In accordance with the ESCON protocol, LSS0 through LSS15 must comprise CKD disks. In the present embodiment, devices on LSS16 comprise fixed-block disks. Alternatively, CKD devices may also be accommodated on LSS16 and above, using the same virtual path mapping as is described below for fixed-block devices.

Data written to primary storage system 30 are backed up on a secondary storage system 40. The secondary storage system, like the primary system, comprises a control unit (CU) 42 and a plurality of LSSs 44. CKD disks 36 and fixed-block disks 38 are arrayed in the LSSs in the manner described above with reference to the primary storage system. The data backup is preferably made using a PPRC service to copy all data written to designated disks 36 and 38 on primary system 30 over network 26 to secondary disks on secondary system 40.

The commands, data and status responses associated with the PPRC service are carried over the network in accordance with the ESCON protocol. A virtual path, which is a clone of the logical path, is created for each relation of a primary LSS to a secondary LSS. In the case of CKD LSSs, between LSS0 and LSS15, a single virtual path is cloned to the logical path. For fixed-block LSSs, all the virtual paths are mapped to logical paths connecting primary LSS0 to secondary LSS0, so that many virtual paths are mapped onto a single logical path. Since the logical path is used in "selector" mode, as described above, only one virtual path may be used at any given instant, implying exclusive use of the logical path to which it is mapped. The virtual path is uniquely associated with the source and target LSSs and the target device for the PPRC operation. When secondary CU 42 receives ESCON device frames, it always uses the logical address (i.e., the secondary LSS and secondary device number) embedded in the CCW parameter list. The virtual path mechanism thus allows PPRC operations to take place between both CKD and fixed-block devices on the primary and secondary storage systems.

The operations of host 22 and of CUs 32 and 42, including particularly the PPRC functions described herein, are typically carried out by the respective processors under the control of software. This software is may be downloaded to the processors in electronic form, over a network, for example, or it may alternatively be provided on tangible media, such as CD-ROM.

Figure 2:
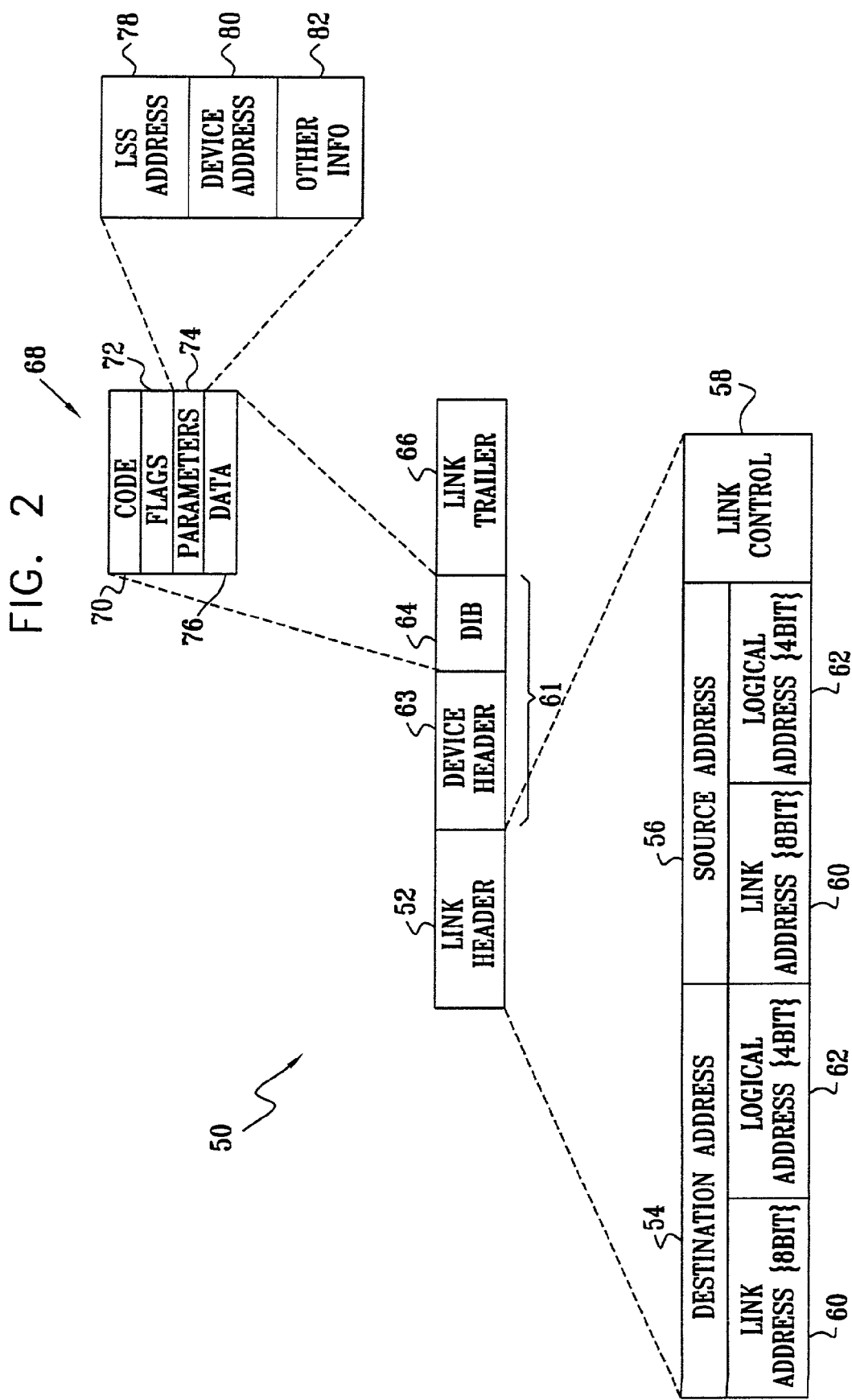
FIG. 2 is a block diagram that schematically illustrates a data frame transmitted over an ESCON link, in accordance with a preferred embodiment of the present invention.

FIG. 2 is a block diagram that schematically illustrates the structure of a device data frame 50, used in implementing a preferred embodiment of the present invention. In accordance with the ESCON standard, frame 50 comprises a link header 52, an information field 61 and a link trailer 66. The link header is made up of a destination address 54, a source address 56 and a link control field 58. Both the destination and source addresses comprise a link address 60 and a logical address 62. The link address is eight bits long and typically identifies primary storage system 30 as the source of the link and secondary storage system 40 as the destination. (For return communications from the secondary storage system, such as status frames indicating the completion status of a PPRC operation, the source and destination addresses are, of course, reversed.) The logical address is four bits long and identifies the control unit images (CUI) corresponding to the source LSS and the destination LSS of the logical channel path.

Information field 61 comprises a device header 63 and a device information block (DIB) 64. Normally, device header 63 comprises an eight-bit device address, indicating the identity of the target device for the data operation, along with certain flags, as specified in the ESCON standard. These flags include information field identifier (IFI) flags, indicating the type of this device frame (command, data, status or control), and device header flags (DHF), used to control the execution of I/O operations. CUs 32 and 42 are normally configured to use the logical channel paths between them in "selector mode," meaning that once system 30 begins sending a chain of device frames to a target device on system 40 over a given logical path, that path is directed exclusively to the target device until the chain has been completed or aborted.

When the IFI flags identify the device frame as a command frame, DIB 64 comprises a command, corresponding to the CCW being executed by CU 32. The DIB also includes certain command flags, including a chain bit that indicates whether the current CCW is the final one in a chain or whether additional CCWs are to be chained to this one. A count field in the DIB specifies a data count for the current CCW. For PPRC operations between CKD disks 36 on LSS0 through LSS15, a command frame of this sort is used to initiate the data copying operation between the source and target volumes, as is known in the art. The command frame is followed by data frames, whose DIB 64 contains the data to be written to the target volume. Secondary CU 42 returns an ending status frame for each CCW in the chain. The status indicates whether the operation indicated by the CCW was completed successfully or failed. A chain is considered successful if a good ending status is received for all of its CCWs.

When the PPRC operation takes place over a virtual path, for LSS16 or above, primary CU 32 sets logical addresses 62 for both the source and destination LSS to zero. In this case, the command frame is not capable of indicating the complete virtual path and device address of the target device. Therefore, secondary CU 42 ignores the contents of device header 63 for both CKD and fixed block associations, providing uniform handling for both cases. Instead, primary CU 32 encodes the details of the secondary LSS and device address in DIB 64 of the data frame that immediately follows the command frame. In other words, CU 32 first sends a command frame to CU 42 to indicate the CCW to be executed, but specifies the secondary LSS and target device address only in the data frame that follows. CU 42 waits to receive and decode this first data frame in order to determine the actual target LSS and device to which the PPRC data are to be copied.

Preferably, when the PPRC operation takes place between SCSI-compliant fixed-block disks 38 on LSS16 and above, DIB 64 of the first data frame 50 comprises a SCSI WFBD 68, as shown in FIG. 2. In accordance with the SCSI standard, the WFBD comprises a command code 70, flags 72, parameters 74 and data 76. Primary CU 32 inserts a LSS address 78 and a device address 80, along with other information 82, in the field assigned for parameters 74. Secondary CU 42 reads the information from this field in order to identify the target LSS and device.

By the same token, when the PPRC operation takes place between CKD disks 36 on LSS0 through LSS15, DIB 64 of the first data frame comprises a CKD PFX (Prefix) command parameter list, which is similar in structure to that of WFBD 68. The parameters listed in the CKD Prefix include the logical volume (LSS and device address) to which the current CCW is directed.

Figure 3:
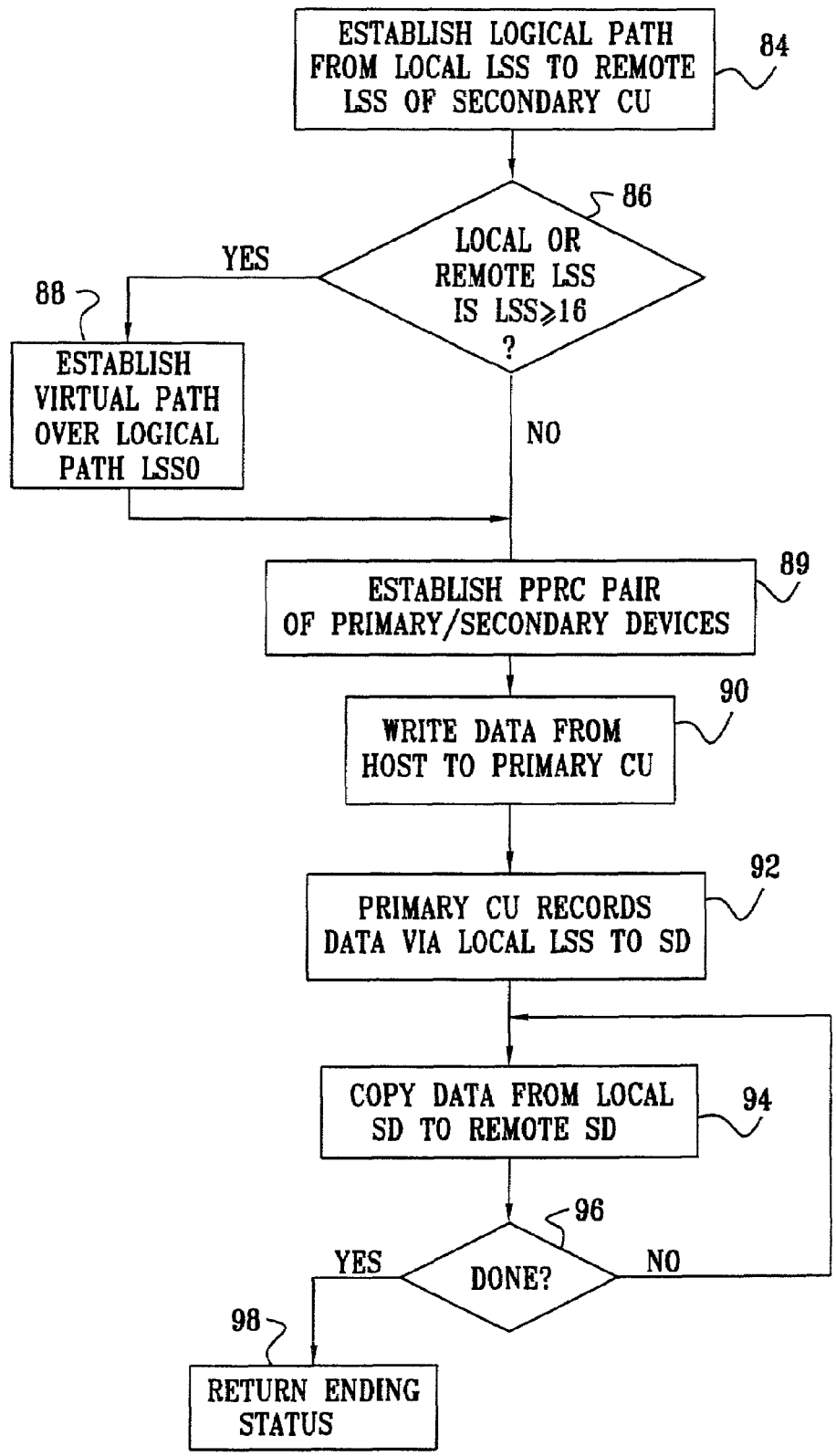
FIG. 3 is a flow chart that schematically illustrates a method for carrying out a PPRC operation, in accordance with a preferred embodiment of the present invention.

FIG. 3 is a flow chart that schematically illustrates a method for carrying out a PPRC operation between storage systems 30 and 40, in accordance with a preferred embodiment of the present invention. The method uses the frame data structures described above with reference to FIG. 2. In order to execute the PPRC operation, a logical channel path is established via network 26 between primary CU 32 and secondary CU 42, at a path setup step 84. In order to determine the logical path to be used, CU 32 checks the local (source) LSS 34 and the remote (destination) LSS 44, at a LSS checking step 86. As noted above, CKD devices 36 are preferably on any LSS between LSS0 and LSS15, while fixed-block devices 38 are on LSS16 and up. If either the local or remote LSS is LSS16 or above, CU 32 maps a virtual path for the PPRC data copying operation, at a virtual path mapping step 88. As noted above, the virtual path uses the logical channel path through LSS0, but is then mapped by CUs 32 and 42 to the actual, designated LSSs.

After a valid CU association has been set up with operative paths, host 22 issues a command to establish a PPRC pair between primary storage device 36 or 38 in local LSS 34 and a corresponding secondary storage device 36 or 38 in remote LSS 44, at a pair establishment step 89. This command causes the primary CU to send a chain of CCWs, telling the selected device in remote LSS 44 to assume its assigned role as the secondary PPRC device.

After these steps are completed, host 22 can write data to a device 36 or 38 on primary storage system 30 that is designated as a PPRC volume, at a host writing step 90. The write command from the host indicates the LSS 34 and the device to which the data are to be written. CU 32 of the primary storage system records the data to the designated device, at a primary recording step 92. In response to the write operation initiated by the host, a PPRC service running on system 30 prepares a chain of CCWs needed to write the data to secondary storage system 40. The CCWs identify the LSS 44 and device address to which the data are to be copied.

CU 32 then begins sending a chain of device frames over the logical channel path, from system 30 to system 40, at a data copying step 94. As noted above, the first device frame in the chain is an ESCON command frame, typically followed by a series of data frames. When CU 42 receives the command frame, it ignores the device header information in this frame, and awaits the subsequent data frame to determine the target device for the PPRC operation. CUs 32 and 42 use the logical channel path in the above-mentioned selector mode, meaning that for the duration of a chain on any given virtual path, the logical channel path is used exclusively for this virtual path. Thus, even though only the first data frame identifies the target LSS and the target device to which the frames are directed, CU 42 passes all of the subsequent frames in the chain to this same LSS and device.

Secondary CU 42 checks the data frames that it receives, to determine when it has gotten the last frame associated with the current CCW, at a completion step 96. When it has received the last frame and copied the data to the appropriate memory location in system 40, CU 42 returns an ending status frame over the logical channel path to CU 32, at an ending step 98. The status frame indicates to CU 32 that the PPRC write operation was completed successfully. At this point, if the ending status was presented for the last CCW in the chain (i.e., the chain bit in the command flags for the CCW was zero) the logical channel path through LSS0 is released to be used by another requester, possibly on a different virtual path.

When an exception occurs in secondary CU 42 or one of the secondary devices 36 or 38, the secondary CU sends an Attention status message to primary CU 32. The Attention status message does not indicate where the device to which it refers actually resides. Therefore, the message is preferably sent to both clusters of processors on the primary CU. One of the clusters will recognize the virtual path on which the Attention status message was received as a path that it controls, by virtue of controlling the relevant primary LSS. That cluster sends a Read Attention Message chain to the secondary CU in order to get the details of the exception.

In the preferred embodiment described above, LSS0 is chosen for convenience, in both the primary and the secondary CU, as the source and destination of the logical path over which the virtual paths connecting fixed-block LSSs are mapped. It will be apparent to those skilled in the art, however, that any of the other LSSs in the address range 1–15 could similarly be used in place of or in addition to LSS0 as the logical address for some or all of the virtual paths. More generally speaking, while the preferred embodiment described herein is directed specifically to carrying out PPRC operations over ESCON links, the principles of the present invention may be applied to other data copying operations, as well as to storage networks of other types that mix fixed-block storage devices with CKD or other storage devices with variable record size.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for copying data over a network operating in accordance with a protocol that supports a given logical address range, the method comprising:
   establishing a logical path over the network from a primary storage system to a secondary storage system using path logical addresses within the given logical address range;
   creating a virtual path over the logical path to carry the data from a source storage device in a first logical subsystem of the primary storage system to a target storage device in a second logical subsystem of the secondary storage system, the first and second logical subsystems having respective first and second subsystem logical addresses which are outside the given logical address range;
   initiating a peer-to-peer remote copy (PPRC) operation to copy the data from the source storage device to the target storage device by sending a command frame over the logical path from the primary storage system to the secondary storage system, followed by a first data frame identifying the target storage device, such that both the command and data frames are arranged to comply with the protocol; and
   sending one or more further data frames over the logical path following the first data frame, the further data frames complying with the protocol and containing the data to be copied in the PPRC operation.

2. A method according to claim 1, wherein creating the virtual path comprises creating a plurality of virtual paths to carry the data between respective source and target storage devices, and wherein establishing the logical path comprises designating one of the path logical addresses to carry the plurality of the virtual paths.

3. A method according to claim 2, and comprising:
   establishing a further logical path over the network to carry the data in a further PPRC operation between further source and destination storage devices in third and fourth logical subsystems of the primary and secondary storage systems, respectively, both the third and fourth logical subsystems having respective third and fourth subsystem logical addresses within the given logical address range; and
   conveying the data between the further source and destination storage devices over the further logical path in accordance with the protocol.

4. A method according to claim 3, wherein the source and destination storage devices in the first and second logical subsystems comprise fixed-block storage devices, while the further source and destination storage devices in the third and fourth logical subsystems comprise devices of a type that stores records of variable size.

5. A method according to claim 2, wherein in accordance with the protocol, the command frame comprises a device header containing an address of the target storage device, and wherein the method comprises, when the frames arrive at the secondary storage system on the designated one of the path logical addresses, ignoring the device header of the command frame so as to read the second subsystem logical address and the address of the target storage device from the first data frame.

6. A method according to claim 1, wherein initiating the PPRC operation comprises creating a chain of one or more channel command words (CCWs), and reserving the logical path exclusively for the virtual path for the duration of the chain, whereby all of the frames associated with the chain are directed to the target storage device.

7. A method according to claim 6, and comprising, upon completion of the chain, sending an ending status frame in accordance with the protocol from the secondary storage system to the primary storage system to indicate successful completion of the CCWs, and releasing the reserved logical path responsive to the ending status frame.

8. A method according to claim 1, wherein initiating the PPRC operation comprises inserting a command parameter list in a data block of the first data frame, wherein the list identifies the second logical subsystem and the target storage device.

9. A method according to claim 8, wherein the command parameter list belongs to a Write Fixed Block Data (WFBD) command in accordance with a Small Computer System Interface (SCSI) standard.

10. A method according to claim 8, wherein the command parameter list belongs to a count key data (CKD) Prefix.

11. A data storage system, comprising:
   one or more logical subsystems, including at least a first logical subsystem having a first subsystem logical address, each of the logical subsystems comprising one or more storage devices arranged to store data; and
   a control unit, coupled to the logical subsystems and to a network operating in accordance with a protocol that supports a given logical address range, the control unit being arranged to establish a logical path over the network to a secondary storage system using path logical addresses within the given logical address range, and to create a virtual path over the logical path to carry the data from a source storage device among the one or more storage devices in the first logical subsystem to a target storage device in a second logical subsystem of the secondary storage system having a second subsystem logical address, wherein the first and second subsystem logical addresses are outside the given logical address range,
   wherein the control unit is further arranged to initiate a peer-to-peer remote copy (PPRC) operation to copy the data from the source storage device to the target storage device by sending a command frame over the logical path to the secondary storage system, followed by a first data frame identifying the target storage device, such that both the command and data frames are arranged to comply with the protocol, and to send one or more further data frames over the logical path following the first data frame, the further data frames complying with the protocol and containing the data to be copied in the PPRC operation.

12. A system according to claim 11, wherein the control unit is arranged to create a plurality of virtual paths to carry the data between respective source and target storage devices, wherein one of the path logical addresses is designated to carry the plurality of the virtual paths.

13. A system according to claim 12, wherein the control unit is arranged to establish a further logical path over the network to carry the data in a further PPRC operation from a further source storage devices in a third logical subsystem, among, the logical subsystems of the data storage system, to a further target device in a fourth logical subsystem of the secondary storage system, both the third and fourth logical subsystems having respective third and fourth subsystem logical addresses within the given logical address range, and to convey the data between the further source and destination storage devices over the further logical path in accordance with the protocol.

14. A system according to claim 13, wherein the source and destination storage devices in the first and second logical subsystems comprise fixed-block storage devices, while the further source and destination storage devices in the third and fourth logical subsystems comprise devices of a type that stores records of variable size.

15. A system according to claim 12, wherein in accordance with the protocol, the command frame comprises a device header containing an address of the target storage device, and wherein when the frames arrive at the secondary storage system on the designated one of the path logical addresses, the device header of the command frame is ignored by the secondary storage system, which reads the second subsystem logical address and the address of the target storage device from the first data frame.

16. A system according to claim 11, wherein the control unit is arranged to create a chain of one or more channel command words (CCWs), and to reserve the logical path exclusively for the virtual path for the duration of the chain, whereby all of the frames associated with the chain are directed to the target storage device.

17. A system according to claim 16, wherein upon completion of the chain, an ending status frame is sent in accordance with the protocol from the secondary storage system to the control unit to indicate successful completion of the CCWs, and the reserved logical path is released responsive to the ending status frame.

18. A system according to claim 11, wherein to initiate the PPRC operation, the control unit is arranged to insert a command parameter list in a data block of the first data frame, wherein the list identifies the second logical subsystem and the target storage device.

19. A system according to claim 18, wherein the command parameter list belongs to a Write Fixed Block Data (WFBD) command in accordance with a Small Computer System Interface (SCSI) standard.

20. A system according to claim 18, wherein the command parameter list belongs to a count key data (CKD) Prefix.

21. A computer software product for use in a data storage system that is coupled to a network operating in accordance with a protocol that supports a given logical address range, the data storage system including one or more logical subsystems, which include at least a first logical subsystem having a first subsystem logical address, each of the logical subsystems including one or more storage devices arranged to store data, the product comprising a computer-readable medium in which program instructions are stored, which instructions, when read by a computerized control unit of the data storage system, cause the control unit to establish a logical path over the network to a secondary storage system using path logical addresses within the given logical address range, and to create a virtual path over the logical path to carry the data from a source storage device among the one or more storage devices in the first logical subsystem to a target storage device in a second logical subsystem of the secondary storage system having a second subsystem logical addresses, wherein the first and second subsystem logical addresses are outside the given logical address range, and wherein the instructions further cause the control unit to initiate a peer-to-peer remote copy (PPRC) operation to copy the data from the source storage device to the target storage device by sending a command frame over the logical path to the secondary storage system, followed by a first data frame identifying the target storage device, such that both the command and data frames are arranged to comply with the protocol, and to send one or more further data frames over the logical path following the first data frame, the further data frames complying with the protocol and containing the data to be copied in the PPRC operation.

22. A product according to claim 21, wherein the instructions cause the control unit to create a plurality of virtual paths to carry the data between respective source and target storage devices, wherein one of the path logical addresses is designated to carry the plurality of the virtual paths.

23. A product according to claim 22, wherein the instructions cause the control unit to establish a further logical path over the network to carry the data in a further PPRC operation from a further source storage devices in a third logical subsystem, among the logical subsystems of the data storage system, to a further target device in a fourth logical subsystem of the secondary storage system, both the third and fourth logical subsystems having respective third and fourth subsystem logical addresses within the given logical address range, and to convey the data between the further source and destination storage devices over the further logical path in accordance with the protocol.

24. A product according to claim 23, wherein the source and destination storage devices in the first and second logical subsystems comprise fixed-block storage devices, while the further source and destination storage devices in the third and fourth logical subsystems comprise devices of a type that stores records of variable size.

25. A product according to claim 22, wherein in accordance with the protocol, the command frame comprises a device header containing an address of the target storage device, and wherein when the frames arrive at the secondary storage system on the designated one of the path logical addresses, the device header of the command frame is ignored by the secondary storage system, which reads the second subsystem logical address and the address of the target storage device from the first data frame.

26. A product according to claim 21, wherein the instructions cause the control unit to create a chain of one or more channel command words (CCWs), and to reserve the logical path exclusively for the virtual path for the duration of the chain, whereby all of the frames associated with the chain are directed to the target storage device.

27. A product according to claim 26, wherein upon completion of the chain, an ending status frame is sent in accordance with the protocol from the secondary storage system to the control unit to indicate successful completion of the CCWs, and the reserved logical path is released responsive to the ending status frame.

28. A product according to claim 21, wherein to initiate the PPRC operation, the instructions cause the control unit to insert a command parameter list in a data block of the first data frame, wherein the list identifies the second logical subsystem and the target storage device.

29. A product according to claim 28, wherein the command parameter list belongs to a Write Fixed Block Data (WFBD) command in accordance with a Small Computer System Interface (SCSI) standard.

30. A product according to claim 28, wherein the command parameter list belongs to a count key data (CKD) Prefix.

* * * * *